United States Patent Office 3,704,238
Patented Nov. 28, 1972

3,704,238
PROCESS FOR PRODUCING 4,4'-BIPYRIDYL FROM 4,4' - BI(4H)PYRAN OR 4,4' - BIPYRYLENE BY AMMOXIDATION
Roy Dennis Bowden, Runcorn, England, assignor to Imperial Chemical Industries Limited, London, England
No Drawing. Filed Mar. 3, 1969, Ser. No. 803,983
Claims priority, application Great Britain, Mar. 15, 1968, 12,643/68
Int. Cl. C07d 31/42
U.S. Cl. 260—296 D
11 Claims

ABSTRACT OF THE DISCLOSURE 4,4'-bi(4H)pyrans and 4,4'-bipyrylenes are disclosed. These products are made by reducing the corresponding pyrylium salt whereby two molecules of the salt are coupled together to form the bi-(4H)-pyran and the bi-pyrylene. The 4,4'-bi(4H)-pyran or 4,4'-bipyrylene may be treated in the liquid phase with ammonium ions or ammonia in the presence of molecular oxygen to produce a 4,4'-bi-pyridyl.

This invention relates to the production of novel oxygen-containing heterocyclic compounds and more particularly to bipyrans and bipyrylenes and their production, and to the production of bipyridyls.

According to the present invention we provide, as new compounds, 4,4'-bi(4H)-pyrans and 4,4'-bipyrylenes.

4,4'-bi(4H)-pyran has the structural formula:

and 4,4'-bipyrylene has the structural formula:

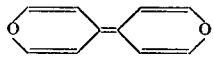

and included within the scope of the invention are compounds having these basic formulae but containing one or more substituents for example alkyl groups in the heterocyclic nuclei.

According to the invention we also provide a process for the production of a 4,4'-bi(4H)-pyran and a 4,4'-bipyrylene which comprises reducing the corresponding pyrylium salt whereby two molecules of the salt are coupled together to form the bi(4H)-pyran and the bipyrylene.

The reduction may be carried out by chemical or electrolytic means. Suitable chemical reducing agents are those having a redox potential more negative than −0.78 volt in an aqueous system as compared with the saturated calomel electrode and include organic and inorganic reducing agents. Examples of suitable inorganic reducing agents are actvie metals such as zinc, or zinc amalgam.

Electrolytic reduction may be achieved at electrode potentials in an aqueous system more negative than −0.78 volt with respect to the saturated calomel electrode and using apparatus conventionally used in electrolytic reduction processes. In particular the reduction may be carried out at the cathode of an electrolytic cell, the cathode being of mercury or another metal of high hydrogen overpotential, for example copper or lead. The electrolyte is an aqueous medium, preferably neutral or acidic, containing the pyrylium salt to be reduced.

The reduction, either by chemical or electrolytic means, may conveniently be carried out in an aqueous medium. The solution preferably has a pH of less than 7 since pyrylium salts tend to hydrolyse in aqueous alkaline solution. Also, the reduction is preferably carried out in the presence of an organic solvent for the pyrylium salt starting material and for the bipyran product, for example acetone or a water-immiscible organic solvent, for example diethyl ether and hydrocarbons for example toluene and benzene, and alcohols particularly those of high molecular weight.

The reduction may be carried out over a wide range of temperatures, for example from −30° C. to +30° C. although higher or lower temperatures than these may be used if desired.

The product of the reduction comprises a mixture of a 4,4'-bi(4H)-pyran and a 4,4'-bipyrylene together with some by-products which are usually in the form of polymeric material. The product may be separated into its component compounds by conventional means, for example by preparative gas/liquid chromatography. The bipyrans and bipyrylenes of our invention may be converted to 4,4'-bipyridyls. A further feature of the invention, therefore, is the provision of a process for the production of a 4,4'-bipyridyl by treatment of a 4,4'-bi(4H)-pyran or 4,4'-bipyrylene in the liquid phase with ammonium ions or ammonia in the presence of molecular oxygen.

Ammonium ions may be introduced into the reaction mixture as such or they may be generated in situ. It is preferred to introduce ammonium ions in the form of an ammonium salt, and suitable ammonium salts include the salts of aliphatic acids, for example ammonium acetate, and the salts of mineral acids, for example ammonium sulphate, ammonium nitrate and ammonium chloride. Alternatively, gaseous ammonia or a solution of ammonia may be introduced into the reaction mixture. Amides hydrolysable to form ammonium ions, for example formamide or urea, may also be employed.

It is preferred to carry out the conversion of the bipyran and bipyrylene to 4,4'-bipyridyl under conditions such that the ammonia is present predominantly as an ammonium salt rather than as free ammonia and for this reason the pH range of from 1 to 7 is especially preferred.

It is preferred to use at least two moles of ammonium ion or ammonia per mole of the bipyran and/or the bipyrylene. The concentration of ammonium ions in the reaction mixture is preferably at least 0.01 molar, for example in the range 0.01 to 2.0 molar.

The reaction medium for the conversion of the bipyran and/or bipyrylene to 4,4'-bipyridyl may comprise water and/or an organic solvent; mixtures of water with one or more organic solvents are especially suitable. A wide range of organic solvents may be used but it is preferred to use an alkanoic acid containing up to 6 carbon atoms in the alkyl group, for example acetic acid or propionic acid. It is especially preferred to use aqueous acetic acid solution containing, for example, from 2% to 50% by weight of acetic acid.

When an ammonium salt is employed in the conversion, the desired acidity of the reaction mixture may be derived from the ammonium salt but additional acid may be provided if necessary. If a free acid is added, this can be conveniently the acid corresponding to the acid radical of the ammonium salt employed. Thus in a preferred embodiment of the invention, aqueous acetic acid is used as the reaction medium and ammonium acetate is used as the source of ammonium ions.

The conversion may be carried out over a wide range of temperature and pressure, depending partly upon the particular reactants and reaction medium used. In general, it is preferred to use temperatures in the range from 15° C. to 150° C., especially in the range from 80° C. to 130° C.

Preferably, tthe conversion is carried out at a pressure in the range from 1 to 30 atmospheres, for example in the range from 1 to 20 atmospheres; higher pressure, for example up to 50 atmospheres, may however be employed.

The partial pressure of the oxygen present is preferably in the range from 0.1 to 20 atmospheres, and it is especially preferred to use a partial pressure of oxygen of at least 0.5 atmosphere, for example about 1 atmosphere. The oxygen may be introduced as substantially pure oxygen or in the form of a mixture, for example air or a mixture of oxygen and nitrogen.

It is particularly advantageous to carry out the conversion not only in the presence of molecular oxygen but also in the presence of cupric ions or ferric ions which may be introduced as cupric or ferric salts but may if desired be produced in situ by oxidation of a cuprous or ferrous salt.

The invention is illustrated but in no way limited by the following example.

EXAMPLE

A solution of pyrylium perchlorate (approximately 4 gms.) in concentrated hydrochloric acid (15 mls.) was added slowly in portions to a stirred suspension of zinc dust (1 gm.) in diethyl ether (30 mls.) maintained at a temperature of between $-2°$ C. and $+2°$ C. The aqueous layer of the mixture became red-brown in colour and the organic layer became yellow. After all the perchlorate had been added the mixture was stirred, with cooling, for a further one hour. The product was diluted with water (50 mls.) and the organic layer was separated, washed, and dried wth sodium sulphate. The organic layer was then divided into three parts (a, b and c) which were treated in the following three ways:

(a) The solvent was evaporated in vacuo and the residual red oil was then evacuated at 1 mm. Hg pressure for a further 1 hour. Preparative gas/liquid chromatographic analysis indicated the presence in the residual oil of two components, having the following mass spectra:

(i) Molecular ion

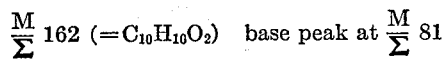

consistent with the structure of 4,4'-bi(4H)-pyran given hereinbefore.

(II) Molecular ion

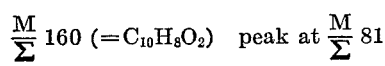

consistent with the structure of 4,4'-bipyrylene given hereinbefore.

(b) The solvent was evaporated in vacuo and the residual red oil was then evacuated at 1 mm. Hg pressure for a further 1 hour. The product was suspended in acetic acid (5 ml.) and added to 15 mls. of a solution of copper acetate (1.5 gms.) and ammonium acetate (1.5 gms.) in 20% aqueous acetic acid. The resulting mixture was heated in air at 80° C. for 3 hours, cooled, and then treated with hydrogen sulphide until no further reaction was observed.

The product was filtered and made slightly alkaline and was shown by gas/liquid chromatographic analysis to contain 4,4'-bipyridyl in a yield (based on pyrylium perchlorate fed to the reaction) of 0.5%.

(c) Was treated as (b) above except that the original diethyl ether was not evaporated. The product was shown by gas/liquid chromatographic analysis to contain 4,4'-bipyridyl in a yield (based on pyrylium perchlorate fed to the reaction) of 1%. No other bipyridyl isomer could be detected.

What I claim is:

1. A process for the preparation of a 4,4'-bipyridyl which consists essentially of treating a 4,4'-bi(4H)-pyran or 4,4'-bipyrylene in an aqueous medium having a pH range of from 1-7 with ammonium ions or with ammonia in the presence of molecular oxygen.

2. A process as claimed in claim 1 using ammonium ions which are introduced in the form of an ammonium salt.

3. A process as claimed in claim 1 wherein the reaction medium is an aqueous solution of acetic acid.

4. A process as claimed in claim 3 wherein the solution contains from 2% to 50% by weight of acetic acid.

5. A process as claimed in claim 3 wherein ammonium ions are introduced in the form of ammonium acetate.

6. A process as claimed in claim 1 wherein the treatment is carried out at a temperature of from 15° C. to 150° C.

7. A process as claimed in claim 6 wherein the temperature is from 80° C. to 130° C.

8. A process as claimed in claim 1 which is carried out at a pressure of from 1 to 30 atmospheres.

9. A process as claimed in claim 1 wherein the partial pressure of the oxygen is from 0.1 to 20 atmospheres.

10. A process as claimed in claim 1 wherein the oxygen is introduced as a molecular oxygen-containing gas.

11. A process as claimed in claim 1 wherein the treatment is carried out in the presence of cupric ions or ferric ions.

References Cited

Campbell et al.: Chem. Abstracts, vol. 64, pp. 15, 852, May 1966, which abstracts British Pat. 1,020,856, dated Feb. 23, 1966.

ALAN L. ROTMAN, Primary Examiner

U.S. Cl. X.R.

260—345.9